US009507733B2

(12) United States Patent
Lyakhovitskiy et al.

(10) Patent No.: US 9,507,733 B2
(45) Date of Patent: Nov. 29, 2016

(54) CACHE DESTAGING FOR VIRTUAL STORAGE DEVICES

(71) Applicant: Microsoft Corporation, Redmond, WA (US)

(72) Inventors: Grigory Lyakhovitskiy, Bothell, WA (US); Karan Mehra, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 154 days.

(21) Appl. No.: 13/924,312

(22) Filed: Jun. 21, 2013

(65) Prior Publication Data

US 2014/0379988 A1    Dec. 25, 2014

(51) Int. Cl.
*G06F 12/12*    (2016.01)
*G06F 12/08*    (2016.01)
*G06F 3/06*    (2006.01)

(52) U.S. Cl.
CPC ........... *G06F 12/12* (2013.01); *G06F 12/0804* (2013.01); *G06F 12/121* (2013.01); *G06F 3/0611* (2013.01); *G06F 3/0664* (2013.01); *G06F 3/0685* (2013.01); *G06F 12/0868* (2013.01); *G06F 2212/262* (2013.01)

(58) Field of Classification Search
None
See application file for complete search history.

(56) References Cited

U.S. PATENT DOCUMENTS

| 6,055,604 | A | 4/2000 | Voigt et al. | |
| 6,289,416 | B1* | 9/2001 | Fukushima et al. | 711/113 |
| 7,047,366 | B1 | 5/2006 | Ezra | |
| 7,577,787 | B1 | 8/2009 | Yochai et al. | |
| 7,904,681 | B1 | 3/2011 | Bappe et al. | |
| 2007/0220201 | A1 | 9/2007 | Gill et al. | |
| 2008/0024899 | A1* | 1/2008 | Chu et al. | 360/69 |
| 2008/0195807 | A1 | 8/2008 | Kubo et al. | |
| 2011/0258391 | A1 | 10/2011 | Atkisson et al. | |
| 2013/0151771 | A1 | 6/2013 | Tsukahara et al. | |
| 2013/0325895 | A1* | 12/2013 | Peters et al. | 707/769 |

FOREIGN PATENT DOCUMENTS

JP    03008015 A * 1/1991 ............... G06F 5/06

OTHER PUBLICATIONS

Non-standard RAID levels, Dec. 21, 2011, Wikipedia.*
EMC VPLEX 5.0 Architecture Guide, In white paper of EMC, published Apr. 2011, retrieved at <<http://www.emc.com/collateral/hardware/white-papers/h8232-vplex-architecture-wp.pdf>> 37 pages.

(Continued)

*Primary Examiner* — Midys Rojas
*Assistant Examiner* — Charles Choi
(74) *Attorney, Agent, or Firm* — Sunah Lee; Micky Minhas; Lee & Hayes PLLC

(57) ABSTRACT

Some implementations may include a virtual storage system to which data is written. The virtual storage system may include a cache and multiple hard drives. Multiple queues may be associated with the multiple hard drives such that each hard drive of the multiple hard drives has a corresponding queue of the multiple queues. A set of candidate rows may be selected from the cache. For each candidate row in the set of candidate rows, destination hard drives may be identified. Each candidate row may be placed in queues corresponding to the destination hard drives. Two or more candidate rows from the multiple queues may be written substantially contemporaneously (e.g., in parallel) to two or more destination hard drives.

20 Claims, 7 Drawing Sheets

(56) References Cited

OTHER PUBLICATIONS

Gill et al., "Queue Depth and When to Destage," In Proceedings of the 4th USENIX Conference on File and Storage Technologies, published Oct. 17, 2005, retrieved at <<http://static.usenix.org/event/fast05/tech/full_papers/gill/gill_html/node25.html>> 2 pages.

"International Search Report & Written Opinion for PCT Patent Application No. PCT/US2013/060952," Mailed Date: Mar. 6, 2014, filed Sep. 20, 2013, 8 Pages.

* cited by examiner

CACHE DESTAGING FOR VIRTUAL STORAGE DEVICES

BACKGROUND

When multiple hard drives are used for storage, adding a cache that uses a faster type of storage media may improve performance. For example, solid state drives (SSDs) or similar devices may be used to provide the cache. The SSDs may be bundled with the multiple hard drives to create virtual storage devices. The cache may enable software applications to write to the virtual storage devices at a faster rate compared to writing to just the multiple hard drives. As applications write to the cache, the contents of the cache may be written to the multiple hard drives using a process known as destaging (also known as write-back).

SUMMARY

This Summary is provided to introduce a selection of concepts in a simplified form that are further described below in the Detailed Description. This Summary is not intended to identify key or essential features of the claimed subject matter; nor is it to be used for determining or limiting the scope of the claimed subject matter.

Some implementations may include a virtual storage system to which data is written. The virtual storage system may include a cache and multiple hard drives. Multiple queues may be associated with the multiple hard drives such that each hard drive of the multiple hard drives has a corresponding queue of the multiple queues. A set of candidate rows may be selected from the cache. For each candidate row in the set of candidate rows, destination hard drives may be identified. Each candidate row may be placed in queues corresponding to the destination hard drives. Two or more candidate rows from the multiple queues may be written substantially contemporaneously (e.g., in parallel) to two or more destination hard drives.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
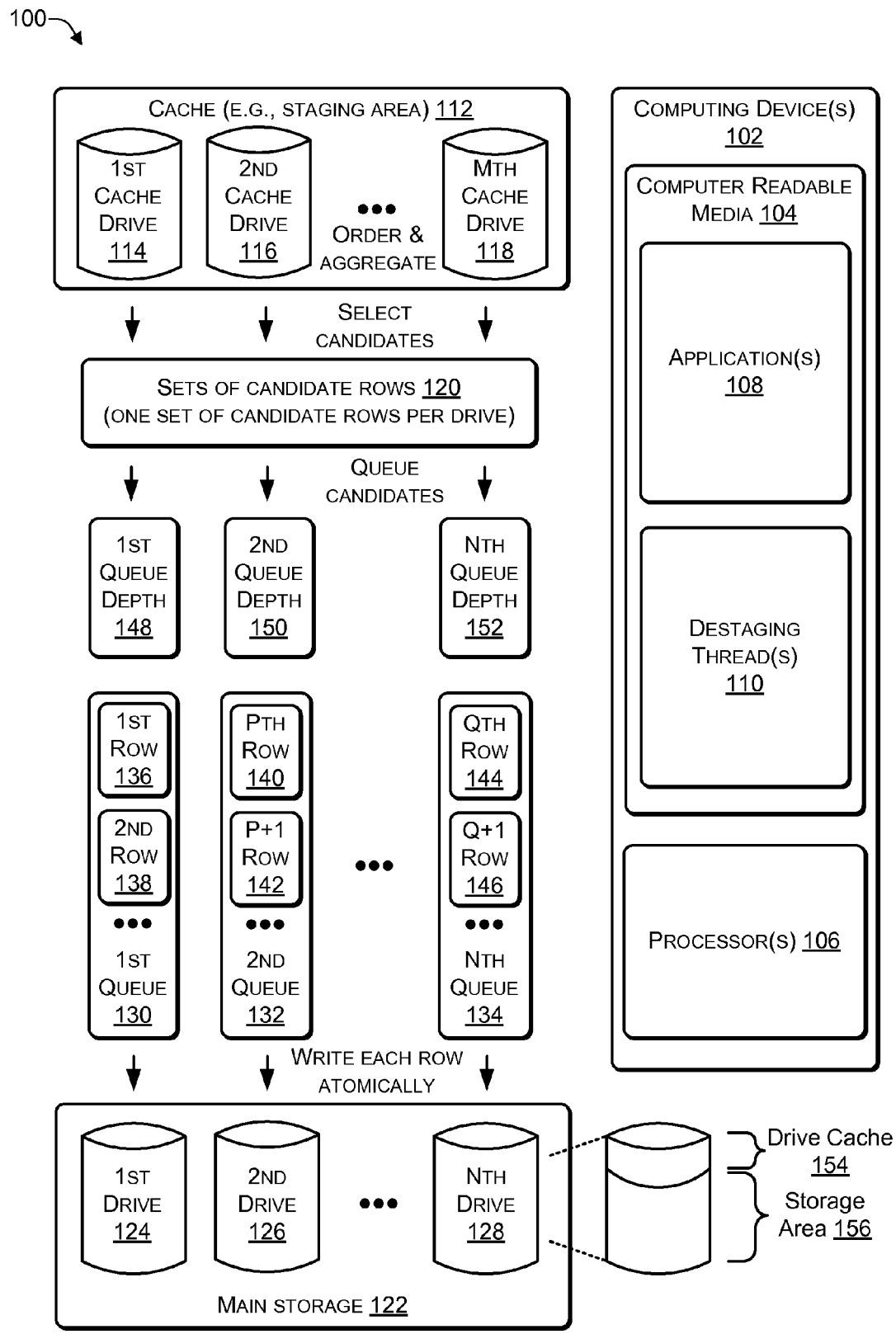
FIG. 1 is an illustrative architecture that includes a destaging module according to some implementations.

The systems and techniques described herein may be used to efficiently destage a cache used for multiple hard drives. For example, the systems and techniques described herein may be used in computer systems having virtual storage devices that include hundreds of hard drives. The term "hard drive" refers to a data storage device used for storing and retrieving digital information using rapidly rotating discs (platters) coated with magnetic material. The hard drive retains data that was written to the hard drive even after the hard drive is powered off. The data written to the hard drive may be read in a random-access manner, e.g., individual blocks of data can be stored or retrieved in any order rather than sequentially. Each hard drive may include one or more rigid ("hard") rapidly rotating discs (platters) with magnetic heads arranged on a moving actuator arm to read and write data to the surfaces.

The virtual storage devices may include main storage and a cache. Both the cache and the main storage may be implemented using various types of devices. Typically, the cache utilizes a type of non-volatile storage device that has faster throughput (e.g., reads and writes) as compared to the main storage. For discussion purposes herein, the cache is illustrated as being implemented using SSDs and the main storage is shown as being implemented using hard drives. However, in other implementations, the cache may be implemented using a storage device such as non-volatile memory (NVM) while the main storage may be implemented using SSDs.

The virtual storage devices may also provide some form of data redundancy, such that, if a particular storage device fails, the data stored on the failed storage device can be recovered. Because data may reside in a drive cache (e.g., a cache built into some drives) until it is de-staged, the cache may also be made more reliable. For example, some form of mirroring may be used to write data to more than one hard drive. As another example, some form of parity may be used. Parity refers to storing a type of redundancy data that is related to the data being stored such that, in the event that the data is lost, the data can be recovered using the redundancy data. For example, in a storage system, some drives may be designated to store parity (e.g., parity data). The parity may be derived from the data using a logical exclusive OR (XOR) functions. For example, one form of RAID may use parity drives to create a system that is both fault tolerant and provides faster performance. One way to implement parity is to designate some drives for data and others to host parity that is derived from an exclusive or (XOR) logic function of the data. If one of the data drives fails, the data of the lost drive may be recovered using the XOR of the remaining drives. Thus, the virtual storage devices may provide (1) fast performance by using a cache (e.g., using SSDs) and (2) reliability by providing mirroring and/or by using parity.

The systems and techniques described herein efficiently destage a cache used for virtual storage devices. First, data may be read from the cache, writing to the hard drives may be initiated and, while writing to the hard drives, data may continue to be read from the cache. Thus, writing to the hard drives and reading from the cache may be performed in parallel (e.g., substantially contemporaneously).

A second way to improve the efficiency of destaging may be to write to more than one hard drive at a time. Data may be selected from the cache for writing to hard drives based on which hard drives will be engaged (e.g., written to). Data may be selected from the cache to enable a maximum number of drives to be written to in parallel. Each particular drive may be provided a destaging queue that includes data to be written to the particular drive. In some cases, to provide reliability, data may be written to at least two drives, e.g., to (1) a primary drive and (2) either a mirror drive or a parity drive. Writes to at least two drives may be performed in parallel. By selecting data in a way that data is written to as many drives as possible in parallel, a number of drives that are idle at any given time may be reduced.

Third, writes may be ordered and, depending on a size of each write, some writes may be aggregated based on the location on the hard drives to which data in the writes is being written. For example, writes that involve writing small (e.g., 4 kilobytes (kb) of data) to nearby locations on a drive may be aggregated into a single larger (e.g., 256 kb) write. Because the majority of the time involved in accessing a hard drive involves positioning the read-write head over a portion of the platter(s) of the hard drive, ordering and aggregating the data according to the destination and then writing the ordered and aggregated data may be more efficient compared to individually writing the data in the order it was written to the cache. For example, data written in this manner may result in the data being written much faster because after the read-write head is initially positioned, a significant amount of time is not needed for re-positioning head for the remaining writes. To aggregate data based on location, a modified first-in-first-out (FIFO) algorithm may be used in which data is selected from the cache for writing based on (1) a length of time that the data has been in the cache and (2) the location to which the data is being written. Aggregating smaller writes (e.g., write involving 4 kb, 8 kb, 16 kb, or the like) into larger writes (e.g., 128 kb, 256 kb, 512 kb, or the like) may enable a single write to be performed instead of many small writes. In addition, ordering the writes (e.g., both aggregated and un-aggregated larger writes) enables the read-write head to write continuously, without backtracking. Because the data to be written is ordered by the destination location of the data, the read-write head can move in a single direction while writing. In contrast, writing unordered data may cause the read-write head to repeatedly seek different locations on a drive to write the data, resulting in a large amount of time spent seeking locations. Thus, ordering the data by location may reduce an amount of seek time of the read-write head when writing the data.

A fourth way to improve the efficiency of destaging may be to allow the cache to fill up to a certain level (e.g., 25% of capacity) before data is selected from the cache for writing to the hard drives. This allows for data that is over-written multiple times, to be written to the hard drives just once. For example, an application may repeatedly modify one or more data items. If the data items are stored in the cache, they may be modified repeatedly in the cache and then written to drives once (or periodically). In addition, accumulating writes in the cache enables data to be ordered and aggregated before being written.

Fifth, each particular hard drive may be provided with a queue in which data to be written to the particular hard drive is placed. The queue may act as a pipeline for data for the particular hard drive. By using queues to queue up data to be written to each hard drive, the amount of time each hard drive is idle may be reduced.

Thus, by using one or more techniques, such as writing to the hard drives while reading from the cache and while deleting previously destaged data from the cache, engaging as many hard drives as possible by using queues (to reduce an idle time of each drive) and writing in parallel, ordering and aggregating data based on a destination write location to reduce how often a read-write head is repositioned, and/or delay writing to the hard drives until the cache is sufficiently primed (to be able to collapse overwrites) based on a remaining capacity of the cache, destaging a cache may be performed faster and more efficiently. The parallelism in the techniques may include writing a set of rows to main storage while simultaneously reading a next set of rows from the cache (e.g., rows that have been confirmed to have been written to the cache) while simultaneously deleting a previous set of rows (e.g., rows that have been confirmed to have been written to the main storage) from the cache.

Illustrative Architectures

FIG. 1 is an illustrative architecture 100 that includes a destaging module according to some implementations. The architecture 100 includes one or more computing devices 102. Each of the computing devices 102 includes a computer readable media 104 and one or more processors 106. One or more of the computing devices 102 may include applications 108 that generate data that is to be written to a storage media. For example, multiple applications 108 may be distributed across multiple computing devices 102. One or more destaging threads 110 may perform various aspects of destaging. In some cases, multiple destaging threads 110 may be distributed across multiple computing devices 102. Each of the applications 108 and the destaging threads 110 may include instructions that are executable by the one or more processors 106 to perform various destaging-related functions, such as those described herein. The computer readable media 104 may also include an operating system, device drivers, and the like.

The data generated by the applications 108 may be written to a cache 112 (also known as a staging area). The cache 112 may include M storage devices (where M>0), such as a first cache drive 114, a second cache drive 116, up to an Mth cache drive 118. The cache drives 114, 116, and 118 may include non-volatile storage devices, such as SSDs, that are faster than hard drives.

Each of the drives 114, 116, and 118 may include data that corresponds to a row that is to be written to the hard drive. In redundant array of independent disks (RAID) a row may be known as a stripe. A row refers to a segment of sequential locations in the virtual storage device that is comprised of one or more segments of sequential locations that are distributed across multiple hard drives in an optionally reliable manner. For example, a row may have a capacity of 128 kb, 256 kb, 512 kb, etc. and include (1) a primary hard drive and optionally (2) either a mirror drive or a parity drive. The actual capacity of a row may vary based on a size of the hard drive, the number of platters in the hard drive, the speed of the read-write head, etc. The destaging threads 110 may aggregate data by row when selecting data from the cache 112 for writing to the hard drives. In some implementations, writes destined for the same row in the virtual storage device may initially be located far apart in the cache 112 and may be ordered and/or aggregated to reduce seek time of the read-write heads when writing to the main storage.

The data aggregated in rows and other rows that are ordered by location may be destined for locations that are in relatively close proximity to each other on a hard drive, such that once the read-write head of the hard drive is positioned for a particular location to which a particular piece of data is to be written, the remaining data in the row and the other rows may be written without incurring a significant amount of time to reposition the read-write head. For example, an amount of time to write data ordered by location may be an order of magnitude less than writing multiple pieces unordered data because the amount of time to reposition the read-write head after writing each piece is insignificant compared to the time to initially position the read-write head.

The destaging threads 110 may select sets of candidate rows 120 from the cache 112 based on (1) an age of each row (e.g., how long each row has resided in the cache 112) and (2) which hard drives will be engaged (e.g., written to). The sets of candidate rows 120 may be implemented on a per drive basis, such that N sets of candidate rows are maintained, with one set of candidate rows corresponding to each drive.

If data is being striped (e.g. distributed across more than one drive), mirrored (e.g. written to more than one drive) or parity drives are used, a row of data may be written to more than one drive. To illustrate, a particular row may be written to both a primary drive and to a mirrored drive or a parity drive, thereby engaging two drives. Thus, depending on the type of data redundancy scheme being used, a row may be written to more than one drive. Also, different rows of data may engage different sets of drives. By selecting rows in such a way as to maximize a number of drives to which data is being written, a number of idle drives may be reduced and the speed at which destaging occurs may be increased. For example, in a virtual storage system with a hundred hard drives, selecting rows that only write to ten hard drives may result in ninety hard drives being idle whereas selecting rows that write to seventy hard drives may result in thirty drives being idle. The destaging threads 110 may select rows for inclusion in the sets of candidate rows 120 based on how many different hard drives in the architecture 100 the data will be engaged (e.g., written to). By writing to many hard drives substantially at the same time (e.g., in parallel), destaging the cache 112 may be faster than if a few hard drives are written to simultaneously. For example, in a hundred hard drive system, writing eighty rows to eighty hard drives in parallel may destage the cache 112 much faster as compared to writing a first ten rows to a first ten hard drives and then on completion writing a second ten rows to a second ten hard drives and so on.

The destaging threads 110 may wait until a predetermined amount of data is stored in the cache 112 before selecting the sets of candidate rows 120. For example, the destaging threads 110 may wait until the cache 112 has filled up to a percentage (e.g., 20%, 25%, 30%, 35%, 40%, or the like) of the total capacity of the cache 112 before selecting the sets of candidate rows 120.

After the sets of candidate rows 120 have been selected from the cache 112, the destaging threads 110 may select rows from the sets of candidate rows 120 and place the rows into queues corresponding to main storage 122 to which the rows are to be written. The main storage 122 may include N hard drives (where N>0), such as a first drive 124, a second drive 126, up to an Nth drive 128. Each of the main storage 122 may have a corresponding queue. For example, the first drive may have a first queue 130, the second drive 126 may have a second queue 132, and the Nth drive 128 may have an Nth queue 134. The destaging threads 110 may select a first row 136 from the sets of candidate rows 120, determine that the first row 136 is to be written to the first drive 124, and place the first row 136 in the first queue 130. The destaging threads 110 may select a second row 138 from the sets of candidate rows 120, determine that the second row 138 is to be written to the first drive 124, and place the second row 138 in the first queue 130.

The destaging threads 110 may select a Pth row 140 (where P>1) from the sets of candidate rows 120, determine that the Pth row 140 is to be written to the second drive 126, and place the Pth row 140 in the second queue 132. The destaging threads 110 may select a P+1 row 142 from the sets of candidate rows 120, determine that the P+1 row 142 is to be written to the second drive 126, and place the P+1 row 142 in the second queue 132. The destaging threads 110 may select a Qth row 144 (where Q>1) from the sets of candidate rows 120, determine that the Qth row 144 is to be written to the Nth drive 128, and place the Qth row 144 in the Nth queue 134. The destaging threads 110 may select a Q+1 row 146 from the sets of candidate rows 120, determine that the Q+1 row 146 is to be written to the Nth drive 128, and place the Q+1 row 146 in the Nth queue 134. In FIG. 1, a particular row may be placed in more than one queue. For example, when the particular row engages more than one drive, the row may be placed in the queues of each of the queues corresponding to the drives to which the row is to be written. For example, if the first row 136 is to be written to the first drive 124 and the second drive 126, the first row may be placed in both the first queue 130 and the second queue 132. To illustrate, the Pth row 140 may be the first row 136.

A first queue depth 148 may be used to count a depth of the first queue 130, a second queue depth 150 may be used to count a depth of the second queue 132, and an Nth queue depth 152 may be used to count a depth of the Nth queue 134. Each time the destaging threads 110 place a row in a queue, the destaging threads 110 may increment a corresponding queue depth counter. When a candidate row is added, the corresponding queue depth counters for all the drives that the candidate row will engage are incremented. The goal at any given time when filling the drive queues is to saturate (e.g., fill the queue) for one of those drives. The process of selecting a row from the sets of candidate rows 120 and adding the selected row to a queue may start with a first queue 130 of a first drive 124 and incrementing the queue depth counters for all engaged drives including a first queue depth 148. Rows are repeatedly selected and added to the first queue 130 and at least the first queue depth 148 incremented until all candidates for the corresponding set of candidate rows for the first drive 124 have been selected or the desired (e.g., predetermined) queue depth is achieved for the first drive 124. The process may then repeat for a second drive 126. Because each row may engage more than one drive, the process first looks at the second queue depth 150 of the second drive 126. If by filling the first queue 130 for the first drive 124, the second queue depth 150 for the second drive 126 has reached a desired (e.g., predetermined) threshold, the process moves to a next drive. However, if the second queue depth 150 of the second drive 126 is less than the predetermined threshold, then rows are added to the second queue 132 corresponding to the second drive 126 until all candidates for the corresponding set of candidate rows for the second drive 126 have been selected or the desired (e.g., predetermined) queue depth is achieved. Once the desired queue depth is achieved for one drive the process moves to a next drive and so on, until all the drive queues have been filled. To illustrate, if the first queue 130 has eight rows, the first queue depth 148 may be eight. As another illustration, if the second queue 132 has four rows, the second queue depth 150 may be four. The destaging threads 110 may repeatedly select a row from the sets of candidate rows 120, place the selected row in a queue (e.g., to be written to one or more drives), and increment the corresponding queue depth counters until each of the queue depth counters 148, 150, or 152 have reached (e.g., saturated) or exceed (e.g., oversaturated) a predetermined threshold. To avoid the situation where all candidate rows from the set of candidate rows corresponding to a drive have been added to the drive's queue but the drive's queue depth is less than the desired queue depth threshold, the number of candidate rows in each set of candidate rows may be selected such that the number of candidate rows is greater than the desired queue depth. For example, when a threshold of eight is used for the queue depth, the destaging threads 110 may repeatedly add rows to queues and increment the corresponding queue depth counters until each of the queue depth counters 148, 150, or 152 is at least eight. Once additional rows cannot be added, the remaining rows from the sets of candidate rows 120 may be discarded. These discarded rows may be selected again when another set of candidate rows are selected.

In some cases, such as when data is striped, mirrored, or when parity is used, a row may be added to more than queue. For example, if the first row 136 is to be written to both the first drive 124 and the second drive 126 because the second drive 126 is a mirror, the first data 136 may be placed in both the first queue 130 and the second queue 132, and both the first queue depth 148 and the second queue depth 150 may be incremented. In this situation, the destaging threads 110 keep track of which rows have been added to which queues. For example, a row identifier may be associated with each row and the row identifier may be added to drive queues. To illustrate, a particular row may be placed in a first queue and a second queue when filling the queue of the first drive. When the particular row is selected as a candidate row when queuing rows for the second drive, the destaging threads 110 may discard the selected row after determining that the particular row has already been added to the queues of both the first drive and the second drive and both corresponding queue depth counters have been incremented.

The destaging threads 110 may write the rows from the queues 130, 132, or 134 to the one or more of the main storage 122. If more than one of the queues 130, 132, or 134 has a row, then the rows may be written to the corresponding drives 124, 126, or 128 substantially at the same time (e.g., in parallel). For example, substantially at the same time, the first row 136 may be written to the first drive 124, the Pth row 140 may be written to the second drive 126, and the Qth row 144 may be written to the Nth drive 128. By engaging many drives at the same time, destaging the cache 112 may occur faster as compared to engaging a fewer number of drives (or a single drive).

After a row has been written to a particular drive of the main storage 122, the particular drive may provide confirmation that the row has been written. After the destaging threads 110 receive confirmation that the row has been written, the corresponding queue depth counter may be decremented after the row has been written to all the drives to which the row is to be written. For example, after receiving confirmation that the first row 136 was written to the first drive 124, the destaging threads 110 may decrement the first queue depth 148 and remove the first row 136 from the first queue 130. For a row that engages multiple drives, the depth queue counters of the corresponding multiple drives may not be decremented until all of the multiple drives have completed writing the row. In this way, slower drives or drives that have more candidate rows than other drives are taken into consideration. For example, assume the second drive 126 is faster than the first drive 124. Suppose all rows hit both drives. Suppose the desired queue depth is 4. Initially, the first queue depth 148 and the second queue depth 150 are zero. Four rows are selected and queued for both drives, e.g., first queue depth 148 and second queue depth 150 are now 4. Assume, second drive 126 completes writing all four rows before first drive 124. None of the queue depth counters are decremented. After drive 124 completes writing a row, both queue depth counters are decremented. Thus, after drive 124 completes another row, the queue depth counters drop to 2, and so on.

To further parallelize the destaging process, the destaging threads 110 may initiate identifying an additional set of candidate rows while the contents of the queues 130, 132, and 134 are being written to the main storage 122. In response to determining that the queue depth of the queue depth counters 148, 150, and 152 has dropped below a predetermined threshold, the destaging threads may select rows from the additional set of candidate rows and add them to the queues 130, 132, and 134. For example, the destaging threads 110 may maintain a queue depth of at least 8 for the queues 130, 132, and 134 (e.g., the queue depth of each queue is at least 8). When the queue depth drops to a percentage of the maximum queue depth, the destaging threads 110 may select rows from the additional set of candidate rows and add them to the queues 130, 132, and 134. For example, a queue depth threshold of 4 for adding rows to the queues 130, 132, and 134 may be 50% of the maximum threshold (e.g., 8) for each of the queues 130, 132, and 134. Of course, the threshold for adding to the queues may vary depend on various factors, such as the speed of the drives, and may be a fixed number or may be a percentage (e.g., 40%, 50%, 60%, or the like) of the maximum threshold. For example, when a desired queue depth is eight, when the queue depth of at least one drive drops below 50% (e.g., four), additional rows may be added to the queues.

The cache 112 along with the main storage 122 may be collectively referred to as a virtual storage device. When the applications 108 write data to the virtual storage device, the data may initially be written to the cache 112 and then destaged to the main storage 122. Writing the data to the cache 112 and then destaging the data to the main storage 122 may be transparent from the perspective of the applications 108. The applications 108 may write to the virtual storage device as if the virtual storage device was a set of one or more drives. The applications 108 may be unaware of the cache 112 and the destaging process.

One or more of the drives 114, 116, 118, 124, 126, or 128 may include a drive cache 154 and a storage area 156. Because many drives, both SSDs and hard drives, include the drive cache 154, the set of candidate rows 120 may not be selected until a confirmation is received from the cache 112 that 100% of the data has been committed, e.g., stored in the corresponding storage area 156 of each of the cache drives 114, 116, and 118. Thus, if the sets of candidate rows 120 is inadvertently lost (e.g., due to a restart), the sets of candidate rows 120 can be rebuilt because the rows are stored in the cache 112. The contents of the cache 112 may survive a restart because the cache 112 may include nonvolatile memory. Rows written to the main storage 122 may not be removed until a confirmation is received from the main storage 122 that a certain percentage (e.g., 100%) of the data has been committed, e.g., stored in the corresponding storage area 156 of each of the drives 124, 126, and 128.

The destage threads 110 may maintain a particular queue depth for each of the main storage 122 such that (1) drives have enough outstanding writes in their corresponding queues so that the drives are not idle (or idle for relatively small amounts of time) and (2) are not overloaded with too many writes, which may slow down other input/output (I/O) that may be sent to the drives (e.g., reads, writes that bypass the cache, etc.). Experiments using different queue depths may be performed to identify a suitable queue depth (e.g., 4) for a particular architecture or system. In the example, provided below, assume a queue depth of D has been determined to be suitable.

In some cases, once a particular queue depth has been achieved, the destaging threads 110 may look to further improve writing efficiency by determining locations of rows in one or more of the queues 130, 132, or 134 and then identifying additional rows from the cache 112 that are near (e.g., within a predetermined threshold) the locations of the rows in the queues 130, 132, or 134. If the destaging threads 110 identify rows in the cache 112 that are near the locations of the rows in the queues, the identified rows may be substituted for other rows in the queues 130, 132, 134. In some cases, the rows in each of the queues 130, 132, and 134 may be re-ordered based on a location to which each of the rows is to be written. For example, if the first row 148 is to be written to a location L on the first drive 124, the destaging threads 110 may search the cache 112 for rows that are to be written to locations near the location L. Assume the destaging threads 110 identify a row R to be written near the location L. The destaging threads 110 may place the row R in the first queue 130 to reduce a seek time of the read-write head of the first drive 122 when writing the first row 136 and the row R. The row R may replace another row in the first queue 130. For example, the row R may be substituted for the second row 138 in the first queue 130 by placing the row R in the first row 130 and removing the second row 138 from the first queue 130. Thus, the destaging threads 110 may identify locations of particular rows in the queues, perform location-based searching, and replace some rows in the queues with other rows that are nearer to the particular rows in the queues.

For each of the main storage 122, the depth queue counters 148, 150, and 152 may count of destage writes sent (or expected to be sent soon) to the corresponding queue. The initial value of depth queue counters 148, 150, and 152 may be zero and the destaging threads may maintain a queue depth of at least D for as many of the drives of the main storage 122 that can be engaged. In addition to depth queue counters 148, 150, and 152, the destaging threads 110 may maintain an array of destage candidates (rows that are next in line for destage and may be written to one or more of the main storage 122) for each of the main storage 122. For example, a set of destage candidate rows, such as the set of destage candidate rows 120, may be created for each of the drives 124, 126, and 128.

The candidate arrays and the queue depth counters 148, 150, and 152 may be used by the destaging threads 110 when the destaging threads 110 determine to refill the queues 130, 132, and 134. First, the destage candidate arrays for all the main storage 122 may be reset (e.g., the contents of the destage candidate arrays may be cleared). The main storage 122 may include slabs. A slab refers to a set of sequential locations in the virtual storage device that is comprised of one or more sets of sequential locations that are distributed across multiple hard drives in an optionally reliable manner. A slab is comprised of multiple rows. Slabs are discussed in more detail in FIG. 2 and FIG. 5.

Destage candidate rows may be selected from slabs by marking all drives used by the slab as suitable for candidate selection and going through the list of rows belonging to the slab and having data in the cache sorted by age (e.g., from oldest writes to the newest writes). Each row may identify N cache element lists, one for each destination drive. If a cache element list is empty or, in case of a parity space, the column is a parity column, assume that the column (drive) will be written to as a part of destage. For each such column (drive), the row may be inserted to the drive's candidate array in such a way that the candidate array is sorted by the log sequence number (LSN) of the oldest log element referenced by the node. If the node does not fit in the candidate array of a drive (all slots are used already for better candidates that are older than the node in hand), the drive may be marked as not suitable for candidate selection. Continue going through the rows of the slab and adding them to the candidate arrays for as long as there is a drive marked as suitable. After completing this process for all slabs, for each of the main storage 122, there is a list of oldest destage candidates (across all slabs) whose destage would have a high chance of resulting in a write to the drive. Note that a particular row may be considered a candidate for more than one drive due to mirroring and/or parity considerations. Thus, the destaging threads 110 may use two loops, an outer loop and an inner loop. The outer loop may go through all slabs, selecting each slab in turn. The inner loop may, for each slab, go through all rows of that slab in an order of descending age to select candidate rows. Thus, the inner loop may be used to identify candidates that engage a most number of drives for each slab. Once the outer loop is complete, a set of candidates may have been identified for all slabs.

After the destage candidates for each drive are identified, the queues 130, 132, and 134 be filled. For each of the drives 124, 126, and 128, if the corresponding queue depth counter 148, 150, or 152 of outstanding/expected destage writes is at the desired queue depth D or above, then take no further action. Otherwise, if the corresponding queue depth counter 148, 150, or 152 of outstanding/expected destage writes is below the desired queue depth D, select the next candidate from the destage candidates. Create packets for eventual writes to the main storage 122 and submit them to drivers responsible for those drives in the OS. If no error was encountered during packet creation and submission, the counter of outstanding/expected destage writes may be incremented by one for each drive. Packets may be used by different parts of an operating system (e.g., device drivers) to communicate. When an application determines to perform a write, the application may call an operating system function or driver with some parameters, such as a file handle, offset in the file, a size of the write, and a pointer to the data that needs to be written. The part of the OS called the I/O manager may create an internal structure called an I/O request packet (IRP) where the information from the application may be stored. The IRP may be sent to a driver using a file system stack. The driver may examine at information and determine where on the volume the file is located. The driver may adjust the offset and send the packet to a second driver responsible for volumes. That second driver may update the packet and send the packet to a third driver responsible for the disk, and so on and so forth. In some cases, a particular driver may split a packet into multiple packets to enable a row to be written to multiple drives in parallel.

For each of the main storage 122 that had any candidates, approximately D outstanding/expected writes have been initiated. The actual number may be higher, if all rows affect more than one drive and saturating one drive causes another drive to be oversaturated (e.g., number of items in the queue exceeds D), or lower, if the initial assumption that all parity columns are going to be affected was wrong.

If some of the queue depth counters 148, 150, and 152 are less than D, portions of the process described above may be repeated more than once, such that all drives have at least some destage writes outstanding/expected queued up.

If there are multiple virtual storage devices that allocated portions of the main storage 122, then portions of the above process may be repeated for each of the multiple virtual storage devices. In order to prevent some virtual storage devices from starving others, virtual storage devices that have data to be destaged may be kept in a list, with a first virtual storage device allowed to queue candidates first, followed by a second virtual storage device, etc. The order of the virtual storage devices in the list may be rotated each time the queues 130, 132, and 134 are refilled. For example, when refilling the queues 130, 132, and 134, the second virtual storage device may be allowed to queue candidates first, a third virtual storage device may be allowed to queue candidates next, and so on.

The queues 130, 132, and 134 may be refilled when one of the following occurs: (1) the corresponding queue depth counter for one of the drives drops to a predetermined threshold (e.g., D/2) or (2) a new virtual storage device to be destaged is added to the rotating list.

Replay packets follow rules similar to those discussed above. A replay packet is an internal structure having a 1:1 correspondence with writes to the parity journal 304. The destaging threads 110 determine when to remove data from the cache to reduce a number of flushes. A flush (e.g., also referred to as a flush command or a synchronize cache command) may instruct a drive to commit (e.g., write) all the data in the drive cache 154 to the storage area 156. In some cases, a flush is a blocking command in that no additional writes are accepted (e.g., additional writes are blocked) until the drives has completed writing the contents of the drive cache 154 to the storage area 156. Because a flush is a blocking command, reducing how often flushes are performed may improve throughput of writes to the drives. Therefore, the destaging threads 110 may use an algorithm to determine when to perform flushes in order to reduce how often flushes are performed. For example, the destaging threads 110 may wait to see if another thread (e.g., one of the applications 108) performs a flush. If another thread performs a flush, then the destaging threads may remove writes (and corresponding data) from the cache 112 or start the destage process, depending on whether sets of candidate rows have been selected and placed in the queues 130, 132, or 134. For example, if another thread initiates a flush and the destaging threads 110 determine that candidate rows have been placed in the queues 130, 132, or 134, the destaging threads may remove particular writes (and corresponding data) from the cache 112 that were sent to the main storage 122, because the flush would cause the particular writes to be committed to the storage area 156. As another example, if another thread initiates a flush and the destaging threads 110 determine that the cache is close to a predetermined threshold, the destaging threads 110 may initiate the destaging process by identifying the sets of candidate rows 120 etc. To illustrate, the destage process may be initiated after the cache has filled to 25% capacity. If a flush occurs and the destaging threads 110 determine that the cache is 20% full or greater, then the destaging threads 110 may initiate the destaging process. If another thread does not perform a flush, the destaging threads may periodically determine when a previous flush occurred. If an amount of time that has elapsed between the time the previous flush occurred and a current time exceeds a predetermined threshold, the destaging threads 110 may perform a flush. Thus, by piggybacking on flushes performed by other threads, the destaging threads 110 may reduce how often flushes are performed, thereby reducing how often writes to the main storage 122 are blocked, thereby increasing throughput, e.g., a number of writes performed in a particular amount of time.

One tradeoff for reducing a number of flushes is that if the system crashes in the middle of writing some writes may be repeated after the system has restarted. However, in the case of parity the old parity may not be relied upon after a system crash. So the parity log may contain a new parity that was to be written to the main storage plus pointers to the corresponding new data. After a system crash, the "new parity+new data" writes may be repeated to the new space before the normal destage process resumes. Whenever the queues 130, 132, or 134 are to be refilled, the destage threads 110 may dequeue a replay packet from the main replay list of the space, determine which columns (drives) would be written to if the packet were to be replayed, and if for any of the queues 130, 132, or 134 the queue depth counters 148, 150, or 152 of outstanding/expected destage writes is less than D, a replay process may be started and the queue depth counters 148, 150, or 152 incremented accordingly. Replay is the process of repeating destages that were performed before a crash. For simple and mirror spaces, the replay process is similar to destage because the writes may be repeated without any corruption occurring. For storage that uses parity, if "old parity" was replaced with "old parity XOR old data XOR new data" before the crash and is performed again after the system restarts, the result may be "(old parity XOR old data XOR new data) XOR old data XOR new data" which is not a desirable result.

After a row has been written to a hard drive, a flush command may be sent that instructs the drive to persist everything written so far to commit the row (e.g., store the row in the storage area 156 of a drive), the row may be removed the row from the cache 112.

Physical disk flushes may slow down the disks, because the disks do not have as much flexibility as to when and how to write data. Thus, enabling the physical disk to determine when to flush, in what order to perform the flush, and how much to flush, may produce better results.

To further speed up the destaging process and make the destaging process more efficient, flushes may be grouped together and performed together (e.g., at the same time) rather than individually (e.g., one at a time). For example, one flush may be performed for each set of candidate rows rather than for each row individually. Destage packets waiting for a flush may be dispatched to take advantage of any flush of the cache 112.

Many of the techniques described herein may be performed in parallel (e.g., substantially contemporaneously). For example, in some cases, at least two or more of the following techniques may be performed in parallel: (1) writing rows from the queues 130, 132, or 134 to the main storage 122, (2) reading additional sets of candidate rows from the cache 112, (3) deleting rows that have been destaged from the cache 122 (e.g., after a flush), (4) identifying candidate rows for inclusion in the sets of candidate rows 120, and (5) reading rows from the sets of candidate rows 120 and placing the rows in one or more of the queues 130, 132, or 134.

Thus, one or more techniques may be used individually or in combination to speed up destaging the cache 112 of a virtual storage device. For example, data from smaller writes may be aggregated into rows and ordered based on a destination location of each of the smaller writes. Writing a row to a hard drive may reduce the amount of time used by a read-write head to be positioned on one or more platters as compared to writing the smaller writes individually. Candidate rows may be selected based on which drives are engaged to enable a large number of drives to be written to in parallel. Each hard drive may have a write queue in which rows that are to be written to a corresponding hard drive are queued up. A queue depth may be maintained for each hard drive to reduce an amount of time that each drive is idle. For example, rows may be added to each queue until a maximum queue depth is reached and new rows added to the queue after the queue depth drops below a predetermined threshold. Further parallelism may be achieved by writing rows to multiple hard drives while (e.g., substantially at the same time) an additional set of candidate rows are being selected. The result of using one or more of these techniques may be a faster destaging process as compared to a conventional destaging process. The faster destaging process may be particularly noticeable for virtual storage systems that include tens, hundreds, or even thousands of hard drives.

Figure 2:
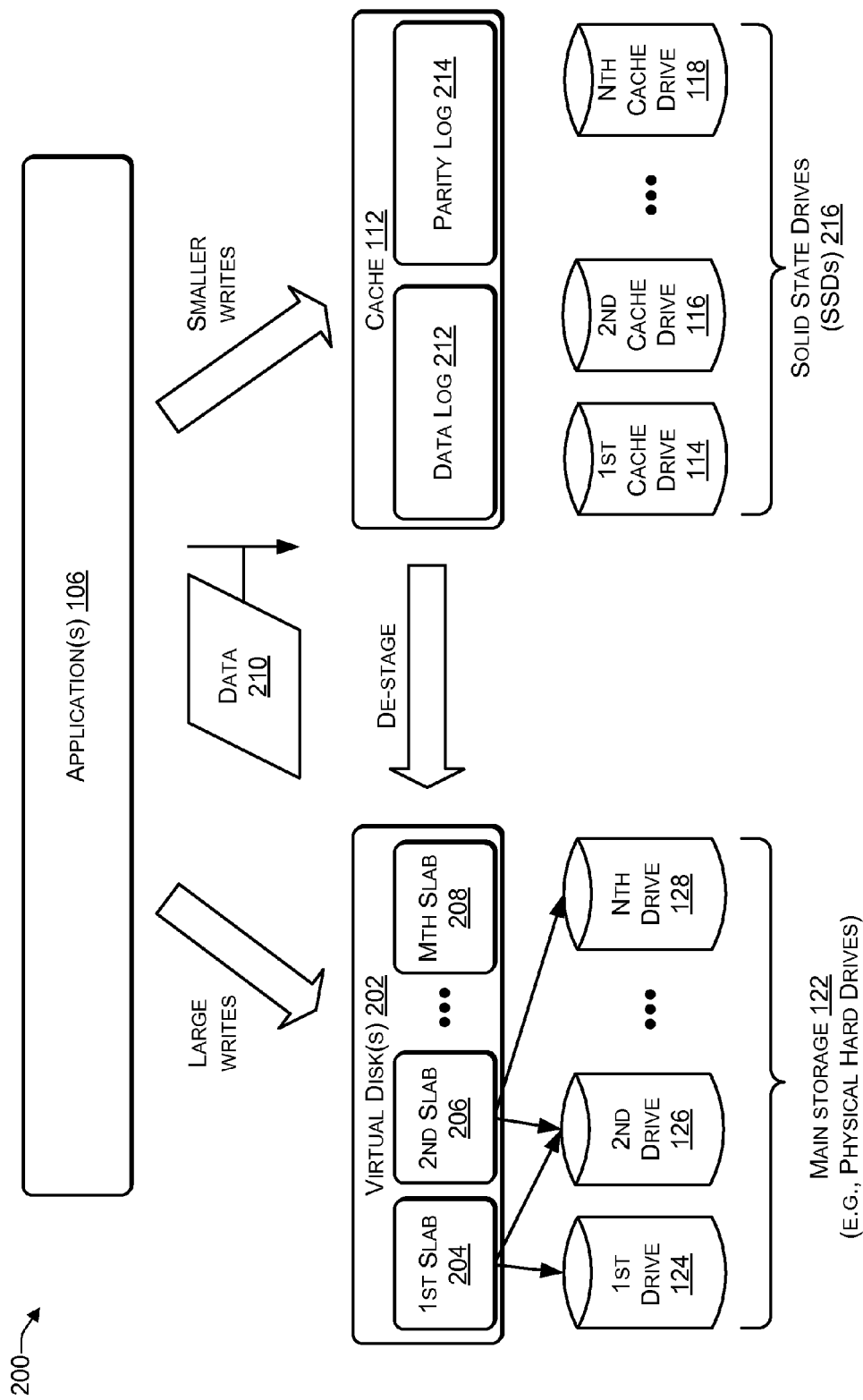
FIG. 2 is an illustrative architecture that includes a virtual storage system according to some implementations.

FIG. 2 is an illustrative architecture 200 that includes a virtual storage system according to some implementations. The virtual storage system 200, may include virtual disks 202 having M slabs (where M>0), such as a first slab 204, a second slab 206, up to an Mth slab 208. For example, the slabs 204, 206, and 208 may appear as a virtual disk, which can be divided into a number of volumes, which are exposed as different drive letters to the applications (for example, G: and H:). Volume boundaries may or may not coincide with slab boundaries. The applications 108 may write data, such as the data 210 to one or more of the virtual volumes (e.g., slabs 202, 204, or 206). Each of the slabs 202, 204, or 206 may be hosted by (e.g., physically stored using) one or more of the main storage 122. For example, the first slab 204 may be hosted by the first drive 124 and the second drive 126. As another example, the second slab 206 may be hosted by the second drive 126 and the Nth drive 128. Each slab may use its own resiliency schema. For example, slab 1 may be a 2-way mirror across disks 1 and 2, while slab 2 may be a 1-way parity across disks 3-10.

If the data 210 to be written is greater than or equal to the particular size (e.g., greater than or equal to 256 kb), the data 210 may be considered a large write and the data 210 may be written to the virtual disks 202. If the data 210 to be written is less than a particular size (e.g., less than 256 kb), the data 210 may be considered a small write and the data 210 may be written to the cache 112. Thus, the virtual storage system 200 may determine whether the data 210 is written to the virtual disks 202 or the cache 112 based on the size of the data 210. For a virtual storage device that uses parity, all writes (e.g., both large writes and small writes) to the virtual storage device may be sent to the cache.

Smaller writes may be stored in a data log 212. A parity log 214 may be used to safeguard against the data and parity on the main storage getting out of sync if a crash happens during destage. Should a crash occur, data may be recovered from the data log 212 and parity may be recovered from the parity log 214. The cache drives 114, 116, and 118 may be drives that have faster access (e.g., read and/or write) times as compared to the drives 124, 126, and 128. For example, the cache drives 114, 116, and 118 may be implemented using SSDs 216. In some cases, the contents of the main storage 122 and the drives 216 may overlap. For example, some SSDs may be used to host the data log 212 and the parity log 214 and to host some fast slabs that do not have a write back cache (e.g., no cache, no destaging).

After smaller writes are stored in the cache 112, the cache 112 may be destaged (e.g., by the destaging threads 110 of FIG. 1) using one or more of the techniques discussed herein. For example, data in the data log 212 may be aggregated into rows of a particular size (e.g., 256 kb) and ordered based on a destination location of the data, candidate rows may be selected from the cache 112 based on which drives are engaged to enable a large number of drives to be written to in parallel, etc.

Figure 3:
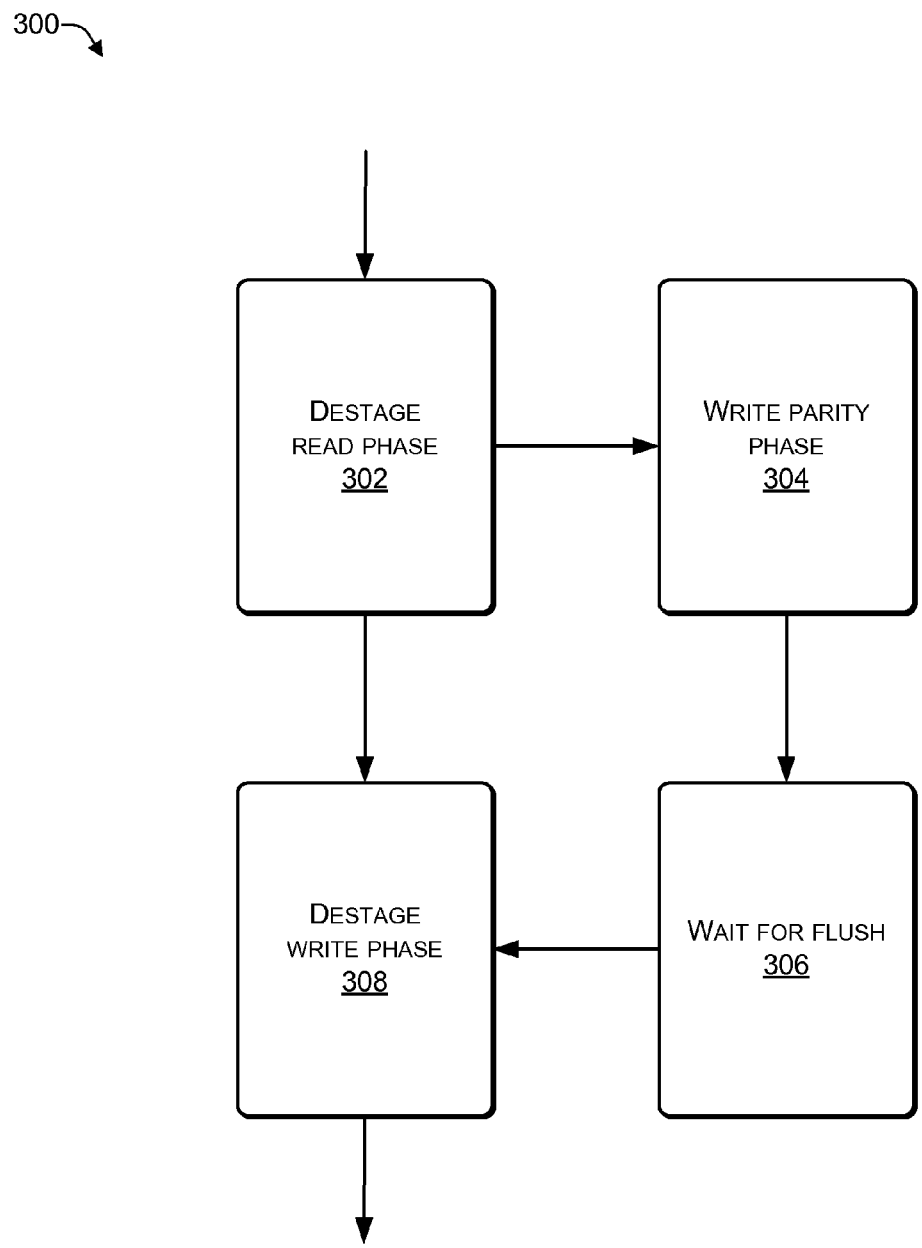
FIG. 3 is a flow diagram of an example process that includes phases of a destage according to some implementations.

FIG. 3 is a flow diagram of an example process 300 that includes destage read phase according to some implementations. The process 300 may be performed by the destaging threads 110 of FIG. 1.

At 302, a destage read phase may be performed, in which data is read from the cache 112 (e.g., from the data log 212).

At 304, a write parity phase may be performed, in which parity (e.g., XOR) values are calculated and written to the cache. In some implementations, the destage read phase 302 and the write phase 304 may be performed in parallel (but not for the same row as all elements are read before calculating a new parity).

If the write phase 304 is performed, the process may proceed to 306, where the process may wait until the cache is flushed. For example, in FIG. 1, flushing the cache 112 may include determining whether all the data in the cache 112 has been committed to one or more of the main storage 122.

At 308, a destage write phase may be performed, in which data and, optionally, parity are written to the drives (e.g., the main storage 122).

The destage process 300 may be orchestrated by a dedicated destage thread (e.g., one or more of the destaging threads 110), which is woken up periodically to a) put more candidate rows into the queues, if necessary, b) help partial candidate rows to go through the "wait for flush" 306, and c) remove data that has been destaged from the cache as needed basis. Because removing data from the cache may take a long time to execute, the operation may be executed asynchronously (e.g., in parallel) with filling the queues. In an implementation, the cache is maintained as a log. The calculation of a new log start log sequence number (LSN) may be performed by the destage thread. The new log start LSN may be stored in the virtual disks 202 and a log advance work-item may be queued to flush main storage 122 and move the log start to the pre-calculated location. This is another optimization. The log advance is to be performed periodically. The log advance includes: flushing the drives of the main storage 122 to commit the candidate rows to the storage area 156 of the hard drives, moving log start (LSN) in the data log 212 (effectively removing records that have already been destaged), and flushing log drives (e.g., the cache 112) to commit the new log start LSN to the storage area 156 of the SSDs. Flushing the drives of the cache 112 and the main storage 122 may take a lot of time, so flushing the drives may be performed while destaging more data. For example, a determination may be made as to how much a log may be advanced (a fairly quick operation) synchronously with selecting and/or queueing candidate rows, but the actual flushing of drives and moving log start may be performed separately.

Replay of parity records on attach after a system crash is performed in a similar manner. Parity records are enumerated during initialization of the cache which is done as a part of initializing the virtual storage device, replay packets are created for them and stored in a linked list. Once the virtual storage device is ready to accept read and write requests, the destage task is started. The destage task dequeues a number of packets from the list and kicks off the replay process for them independently. The first phase of replay is reading new parity/data from the parity log, and the second phase is writing that parity/data to the permanent location on the main storage 122. When some (but not necessarily all) replay packets go through both phases, more replay packets are dequeued from the list and executed.

Figure 4:
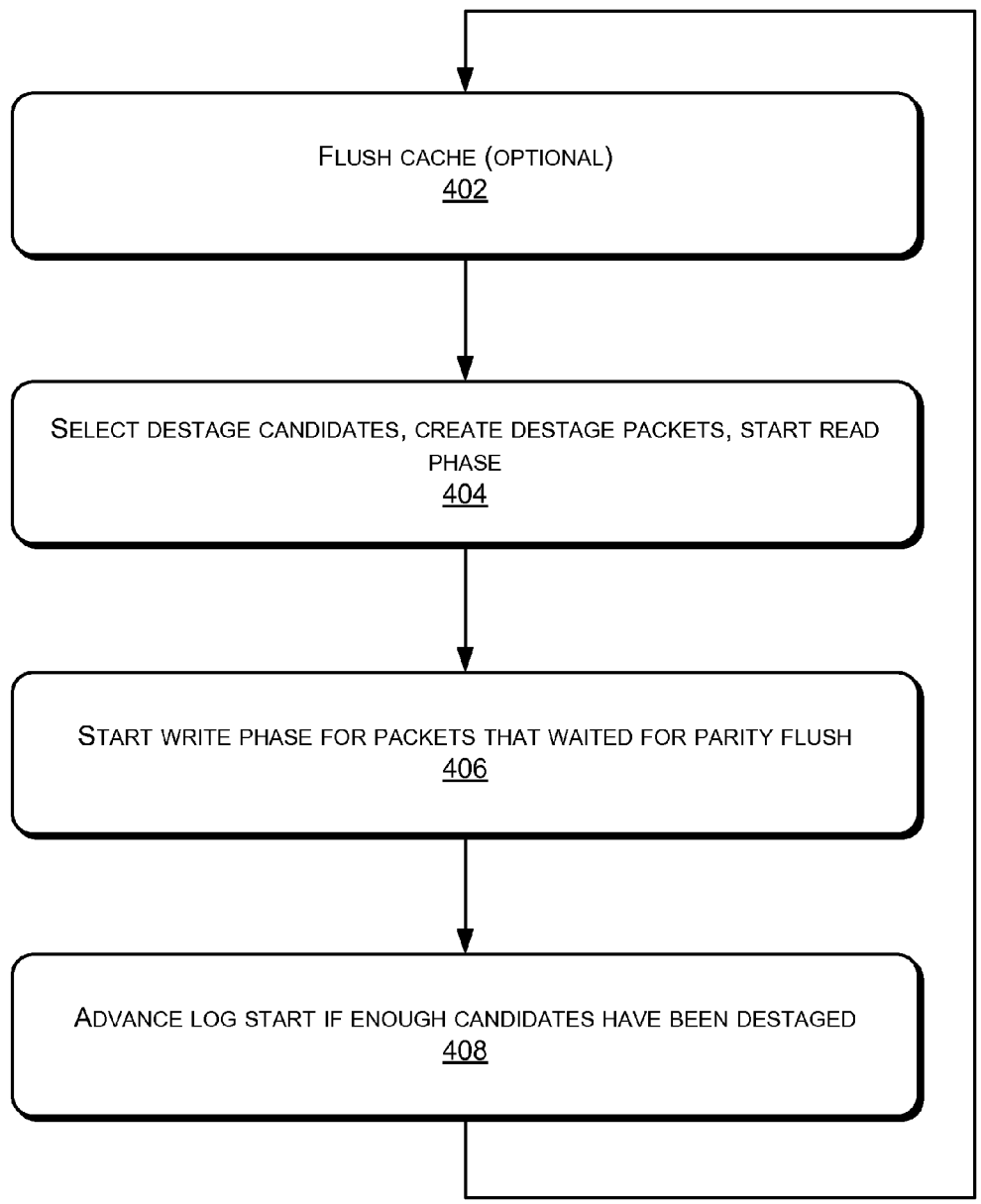
FIG. 4 is a flow diagram of an example process that includes flushing a cache according to some implementations.

FIG. 4 is a flow diagram of an example destage process 400 according to some implementations. The process 400 may be performed by one or more of the destaging threads 110 of FIG. 1.

At 402, a cache may be flushed. The cache flush is optional and may only be performed under specific conditions. For example, in FIG. 1, the cache 112 may be flushed by determining whether contents of the cache 112 have been committed to the main storage 122 (e.g., confirmed as being written to the storage area 156 of each of the main storage 122). In response to determining that the contents of the cache 112 have been committed to the main storage 122, any data stored in the cache 112 may be deleted (e.g., removed). A log advance involves freeing a portion of the log at the head which has already been destaged and flushed to drives. At 404, destage candidates may be selected, destage packets may be created, and a read phase may be started. For example, in FIG. 1, the sets of candidate rows 120 may be selected from the cache 112, added to the queues 130, 132, or 134, and rows may be read from the queues 130, 132, or 134 for writing to the main storage 122.

At 406, a write phase may be started for packets that waited for a parity flush. If there are a number of packets waiting for flush above a certain threshold, a flush may be proactively issued and the destage write phase for the packets that waited for the parity flush may be initiated.

At 408, a log start may be advanced after enough rows have been destaged from the cache.

Thus, a destage process may include one or more of the following:

1. (Optional) Persist the content of data log 212 in cache 112 and remember up to which point 212 was persisted. The maximum LSN in the data log up to which all records have been confirmed to be written by drives of the cache 112 is determined. The drives of the cache 112 may be instructed to perform a flush. After the flush has completed, all records up to the aforementioned LSN have been persisted and so the records may be safely destaged. Records that have not been persisted in the data log may not be destaged, because in case of a crash the write may not be available for replaying. Because of the nature of a flush operation, performing fewer flushes is better so flushes may be performed only under certain conditions. For example, if a flush is performed and the aforementioned LSN is such that the log includes 256 MB of destageable data, another flush may not be performed until all the data is destaged.
2. Perform read phase 302. When read phase 302 finishes asynchronously, asynchronous completion routines either perform write phase 308 (if the destination space is simple or mirror or a full row is written to a parity space). If a partial destage is performed on a parity space, then 304 is performed. When 304 is finished, asynchronous completion routines will put the packets to a wait queue where they sit until a flush of cache 112. Once that flush occurs, phase 308 is performed for all packets from the wait queue. If the number of packets in the aforementioned wait queue exceeds a certain threshold (we use half of the desired queue depth), the destage process 400 performs a flush of cache 112, which causes phase 308 to be started for packets from the wait queue. The cache 112 may be flushed prior to that, however, by other threads, e.g. those handling input/output (I/O) from user applications, in which case packets that are currently in the wait queue may be allowed to proceed.
3. (Optional) If enough data has been destaged from the head of the data log by a certain time, e.g. a certain number of bytes or a certain percentage of the data log, the destage process 400 determines by how much the log can be advanced and initiates the advance, as described herein.

Thus, the destage process 400 may include (1) determining that data in the cache has made it to non-volatile storage (either by relying on a previously issued flush or by explicitly issuing a flush if sufficient time has passed), (2) selecting candidate rows from the cache, (3) reading candidate rows from the cache, (4) generating parity data for the candidate rows and writing the parity data to the cache and determining that the parity data in the cache has made it to the storage area of main storage (either by waiting for a flush or by explicitly issuing a flush if sufficient time has passed), (5) writing candidate rows to the main storage, (6) determining that data in the main storage has made it to non-volatile storage (either by waiting for a flush or by explicitly issuing a flush if sufficient time has passed), and (7) removing candidate rows from the cache (e.g., after determining that the candidate rows have been written to the storage area of the drives in the main storage). At least two or more of the seven portions of the destage process may be performed in parallel (e.g., substantially at the same time).

Figure 5:
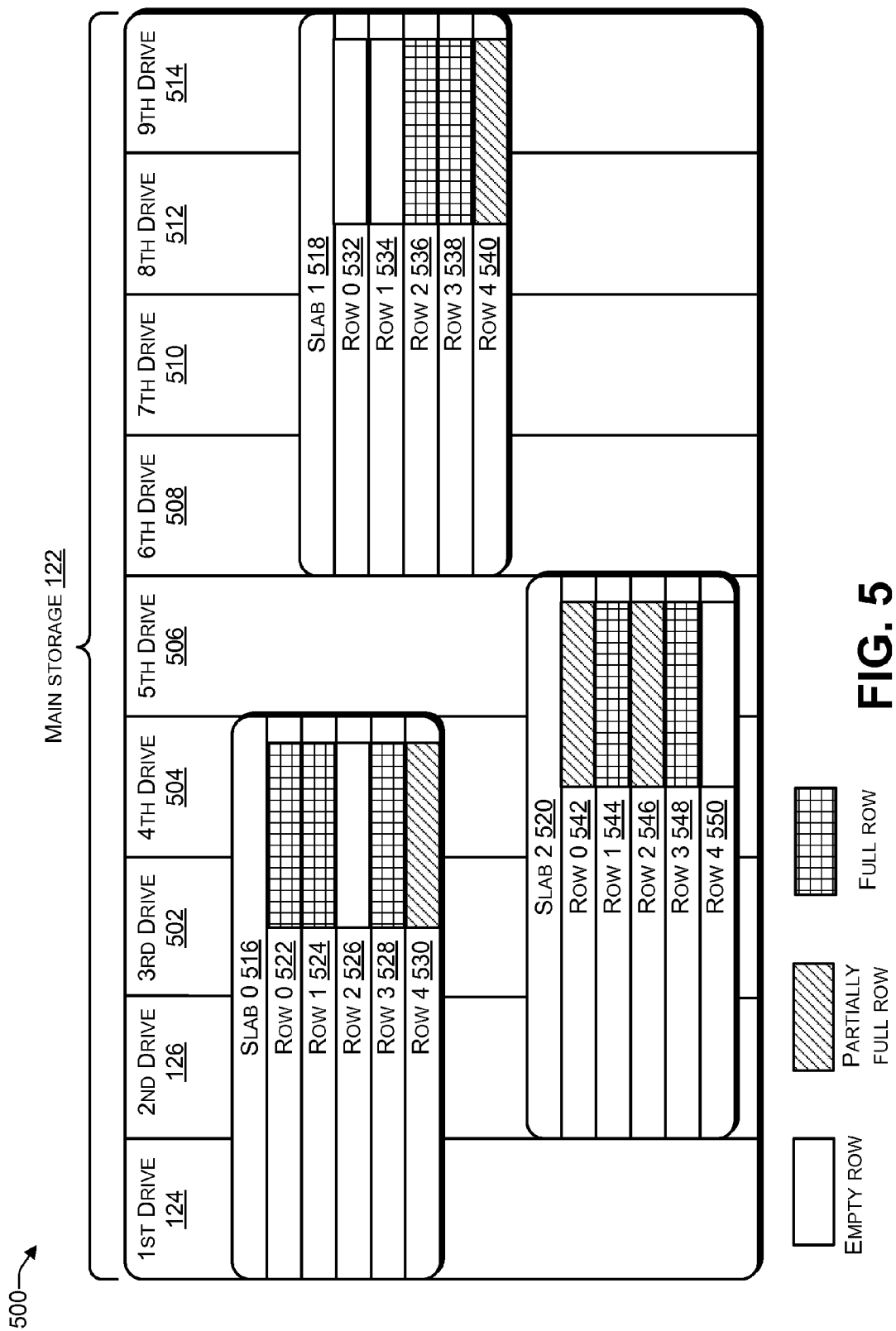
FIG. 5 is an illustrative architecture that includes slabs according to some implementations.

FIG. 5 is an illustrative architecture 500 that includes slabs according to some implementations. The architecture 500 illustrates how slabs and rows may be stored across multiple drives and how destage candidates may be selected using the techniques described herein. As illustrated in FIG. 5, each slab may include multiple rows. Rows in each slab may be empty, partially full, or (completely) full.

As illustrated in FIG. 5, the drives 112 may include nine drives, including the first drive 124, the second drive 126, a third drive 502, a fourth drive 504, a fifth drive 506, a sixth drive 508, a seventh drive 510, an eighth drive 512, and a ninth drive 514. Three slabs, slab 0 516, slab 1 518, and slab 2 520, may be stored across multiple drives (e.g., multiple columns). For example, slab 0 516 may span drives 124, 126, 502, and 504, slab 1 518 may span drives 508, 510, 512, and 514, and slab 2 may span drives 126, 502, 504, and 506. Slab 0 516 may include row 0 522, row 1 524, row 2 526, row 3 528, and row 4 530. Slab 1 518 may include row 0 532, row 1 534, row 2 536, row 3 538, and row 4 540. Slab 2 520 may include row 0 542, row 1 544, row 2 546, row 3 548, and row 4 550. Each of the rows in the slabs 516, 518, and 520 may be empty, partially full, or full, as illustrated in FIG. 5. While nine drives are shown in FIG. 4, with each slab spanning four drives, the number of drives and slabs are purely for illustration purposes. In a given implementation, there may be N drives (where N>0) with slabs stored across at least M drives (where M>1).

In order to make destage faster in situations when multiple sequential streams are written and get redirected to the cache 112 of FIG. 1 (e.g. when using a particular form of RAID such as RAID5 or RAID6), the sets of candidate rows 120 may be selected using various techniques. For example, the sets of candidate rows 120 may be selected using an age-based algorithm in which rows that have spent the longest time in the cache may be selected as candidates for inclusion in the sets of candidate rows 120. For example, each time a row is added to the cache 112, a log sequence number (LSN) may be incremented and then assigned to the row. Rows with a lower LSN may be selected as candidates for destaging before rows with a higher LSN. The sets of candidate rows 120 may be selected when the cache 112 has filled to a predetermined threshold.

As another example, an offset-based algorithm may be used to select the sets of candidate rows 120. In the offset-based algorithm, destage candidates may be selected by row index, i.e. effectively by space offset. The offset-based algorithm may result in more sequential input/output (I/O) being sent to the main storage 122. The offset-based algorithm may work in parallel on as many slabs as possible by working on slabs that reside on non-overlapping sets of drives and where the non-overlapping sets of drives are not being used by another task (e.g., destage for another virtual storage system 200 using the same drives). Destage candidates may be selected starting from lower offsets to higher offsets and may not go backwards (e.g., higher offsets to lower offsets) even if previously destaged nodes become available again before the all the rows in a particular slab have been examined. Destage candidates may be selected based on whether full node optimization can be applied.

In FIG. 5, slab 0 516 and slab 1 518 may be destaged in parallel. In slab 0 516, rows 0, 1 and 3 may be destaged in the same order (e.g., destage for a batch of packets will be initiated in this order, though the destaging may complete in a different order due to the difference in element fragmentation, reordering in the underlying disk stacks, etc).

If slab 0 516 is destaged first, the destaging threads 110 may initiate destage for slab 2 518 while continuing to destage slab 1 518, because slab 1 518 and slab 2 520 reside on non-overlapping drives. However, if the destage for slab 1 518 is completed before the destage of slab 0 516, destaging of slab 2 520 may not be initiated while slab 0 516 is being destaged because the drives used by slab 0 516 and slab 2 520 overlap (e.g., drives 126, 502, and 504 are common to both slab 0 516 and slab 2 520.

Parallelizing writes to the main storage 122 may be performed by selecting the sets of candidate rows 120 such that a maximum number of drives are engaged. For example, in FIG. 5, selecting rows for inclusion in the sets of candidate rows 120 by selecting rows that are destined for slab 0 516 and slab 1 518 may engage 8 of the 9 drives. Similarly, selecting rows for inclusion in the sets of candidate rows 120 by selecting rows that are destined for slab 2 520 and slab 1 518 may engage 8 of the 9 drives, leaving only 1 drive idle. In contrast, selecting rows for inclusion in the sets of candidate rows 120 by selecting rows that are destined for slab 0 516 and slab 2 520 may engage only 5 drives, leaving 4 drives idle.

Figure 6:
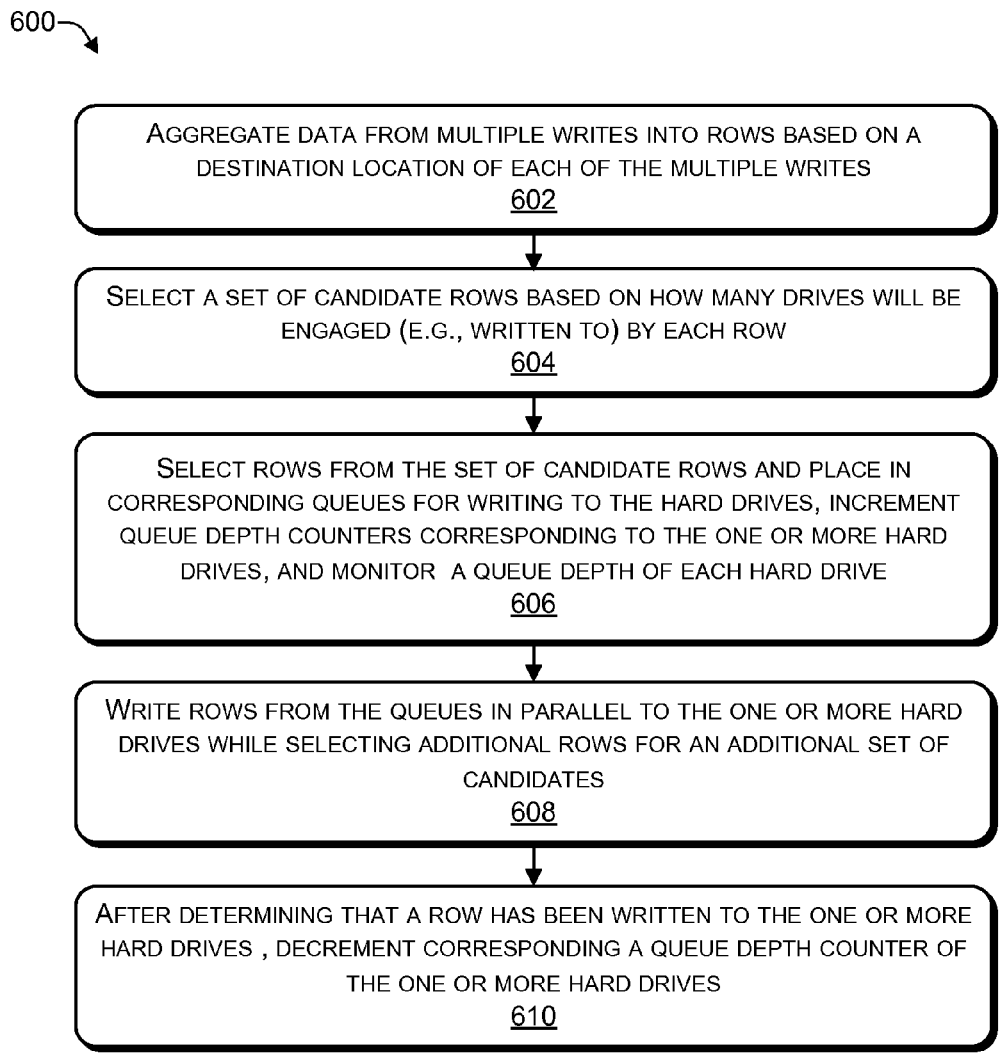
FIG. 6 is a flow diagram of an example process that includes selecting a set of candidate rows based on how many drives will be engaged according to some implementations.

In the flow diagrams of FIGS. 3, 4, and 6, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the processes 300, 400, and 600 are described with reference to the architectures 100, 200, and 500, as described herein, although other models, frameworks, systems and environments may implement these processes.

FIG. 6 is a flow diagram of an example process 600 that includes selecting a set of candidate rows based on how many drives will be engaged according to some implementations. The process 600 may be performed by the destaging threads 100 of FIG. 1.

At 602, data from multiple data writes may be aggregated into rows based on a destination location of each of the multiple data writes. For example, relatively small data writes (e.g., 4 kb) may be aggregated into rows (e.g., of size 256 kb) based on a destination hard drive to which the data write is being written. This may enable a relatively large amount of data (e.g., 256 kb) to be written after the read-write head of the destination hard drive is positioned, without incurring additional time to further position the read-write head as compared to writing multiple data writes individually, without aggregating them. Writes may continue to come in from applications in parallel with the destaging process.

At 604, a set of candidate rows may be selected based on how many drives will be engaged. For example, the sets of candidate rows 120 of FIG. 1 based on how many drives are engaged. For example, selecting rows destined for slab 0 516 and slab 1 518 may engage 9 drives while selecting rows destined for slab 0 516 and slab 2 520 may engage 5 drives. Thus, rows that are destined for slab 0 516 and slab 1 518 may be selected as more drives are engaged as compared to selecting rows destined for slab 0 516 and slab 2 520.

At 606, rows may be selected from the candidate rows and placed in corresponding queues for writing to the hard drives. The queue depth counters corresponding to each hard drive may be incremented when a row is placed in the corresponding queue. The queue depth of each hard drive may be monitored. For example, in FIG. 1, a row may be selected from a set of candidate rows associated with a drive, added to one or more queues of drives to which the row is to be written, and the corresponding queue depth counters may be incremented. Rows may be repeatedly selected from the sets of candidate rows 120, added to one or more of the queues 130, 132, and 134, and one or more of the corresponding queue depth counters 148, 150, and 152 may be incremented until a predetermined (or desired) queue depth is reached. In some cases, once a particular queue depth has been achieved, the destaging threads 110 may look to further improve writing efficiency by determining locations of rows in one or more of the queues 130, 132, or 134 and then identifying additional rows from the cache 112 that are near (e.g., within a predetermined threshold) the locations of the rows in the queues 130, 132, or 134. If the destaging threads 110 identify rows in the cache 112 that are near the locations of the rows in the queues, the identified rows may be substituted for other rows in the queues 130, 132, 134. In some cases, the rows in each of the queues 130, 132, and 134 may be re-ordered based on a location to which each of the rows is to be written. For example, if the first row 136 is to be written to a location L on the first drive 124, the destaging threads 110 may search the cache 112 for rows that are to be written to locations near the location L. Assume the destaging threads 110 identify a row R to be written near the location L. The destaging threads 110 may place the row R in the first queue 130 to reduce a seek time of the read-write head of the first drive 124 when writing the first row 136 and the row R. The row R may replace another row in the first queue 130. For example, the row R may be substituted for the second row 138 in the first queue 130 by placing the row R in the first row 130 and removing the second row 138 from the first queue 130. Thus, the destaging threads 110 may identify locations of particular rows in the queues, perform location-based searching, and replace some rows in the queues with other rows that are nearer to the particular rows in the queues.

At 608, rows from the queues may be written in parallel (e.g., substantially contemporaneously) to the one or more hard drives while (e.g., at substantially the same time) an additional set of candidates is being selected.

At 610, after determining that a row has been written to the one or more hard drives (e.g., to a storage area of the drive), the corresponding queue depth counter may be decremented. For example, if a row is to be written to multiple drives, only after a determination is made that the row has been written to the multiple drives are the corresponding queue depth counters decremented.

Figure 7:
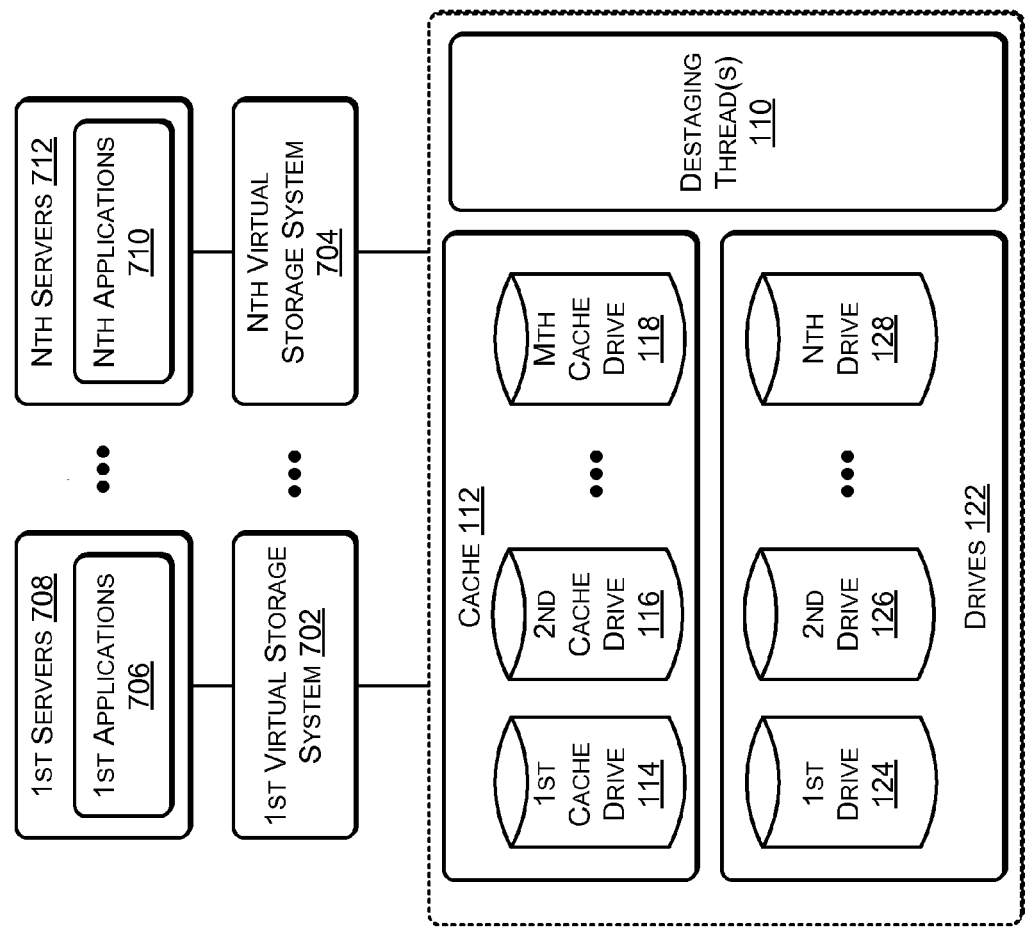
FIG. 7 is an illustrative architecture that includes multiple virtual storage systems.

FIG. 7 is an illustrative architecture 700 that includes multiple virtual storage systems. For example, in a cloud storage environment, multiple clients may each be provided with a virtual storage system. Multiple (e.g., N where N>1) virtual storage systems, such as a first virtual storage system 702 to an Nth virtual storage system 704 may use the cache 112 and the main storage 122 to provide virtual storage systems to multiple clients. For example, a first set of application 706, hosted by a first set of servers 708, may access (e.g., write data to and read data from) the first virtual storage system 702. An Nth set of applications 710, hosted by an Nth set of servers 712, may access the Nth virtual storage system 704.

The destaging threads 110 may destage the cache 112 without the applications 706 and 708 being aware that the multiple virtual storage systems 702 and 704 are using the cache 112 and the main storage 122.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

As used herein, "computer-readable media" includes computer storage media and communication media. Computer storage media includes volatile and non-volatile, removable and non-removable media implemented in any method or technology for storage of information, such as computer readable instructions, data structures, program modules, or other data. Computer storage media includes, but is not limited to, random access memory (RAM), read only memory (ROM), electrically eraseable programmable ROM (EEPROM), flash memory or other memory technology, compact disc ROM (CD-ROM), digital versatile disks (DVD) or other optical storage, magnetic cassettes, magnetic tape, magnetic disk storage or other magnetic storage devices, or any other non-transmission medium that can be used to store information for access by a computing device.

In contrast, communication media may embody computer readable instructions, data structures, program modules, or other data in a modulated data signal, such as a carrier wave. As defined herein, computer storage media does not include communication media.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Conclusion

Although the subject matter has been described in language specific to structural features and/or methodological acts, the subject matter defined in the appended claims is not limited to the specific features or acts described above. Rather, the specific features and acts described above are disclosed as example forms of implementing the claims. This disclosure is intended to cover any and all adaptations or variations of the disclosed implementations, and the following claims should not be construed to be limited to the specific implementations disclosed in the specification.

What is claimed is:

1. A virtual storage system comprising:
a cache;
one or more drives;
one or more processors; and
one or more computer-readable storage media storing instructions executable by the one or more processors to perform acts comprising:
selecting a set of candidate rows from a plurality of rows that are stored in the cache, individual candidate rows of the set of candidate rows selected based on destination drives with which the individual candidate rows engage;
selecting, from the set of candidate rows, a first candidate row to be written to a first plurality of destination drives and a second candidate row to be written to a second plurality of destination drives, each destination drive of the first plurality of destination drives being different than each destination drive of the second plurality of destination drives;
selecting, from the set of candidate rows, a third candidate row to be written to a third plurality of destination drives, wherein a first destination drive of the third plurality of destination drives is common to the first plurality of destination drives, and wherein a second destination drive of the third plurality of destination drives is different than each destination drive of the first plurality of destination drives, and wherein each destination drive of the third plurality of destination drives is different than each destination drive of the second plurality of destination drives;
placing the first candidate row in a first queue corresponding to each destination drive of the first plurality of destination drives, the second candidate row in a second queue corresponding to each destination drive of the second plurality of destination drives, and the third candidate row in a third queue corresponding to each destination drive of the third plurality of destination drives; and incrementing at least one queue depth counters corresponding to at least one destination drive of the first plurality of destination drives, the second plurality of destination drives, or the third plurality of destination drives.

2. The virtual storage system of claim 1, the acts further comprising:

until an individual queue depth counter of an individual destination drive of the first plurality of destination drives, the second plurality of destination drives, or the third plurality of destination drives is at least equal to a predetermined threshold, repeatedly:
  selecting an additional candidate row from the set of candidate rows;
  determining one or more additional destination drives to which the additional candidate row is to be written;
  placing the additional candidate row in a queue corresponding to each destination drive of the one or more additional destination drives; and
  incrementing at least two additional queue depth counters that each respectively correspond to a particular destination drive of the one or more additional destination drives.

3. The computing device of claim 1, the acts further comprising:
  writing the first candidate row to each of the first plurality of destination drives; and
  decrementing the at least one queue depth counter in response to determining that the first candidate row was written to each individual destination drive of the first plurality of destination drives.

4. The computing device of claim 3, wherein at least a first individual destination drive of the first plurality of destination drives is written to in parallel with at least a second individual destination drive of the second plurality of destination drives.

5. The computing device of claim 3, the acts further comprising:
  in response to determining that writing the first candidate row to each of the first plurality of destination drives was successful, removing the first candidate row from the first queue corresponding to each destination drive of the first plurality of destination drives and decrementing the at least one queue depth counter.

6. A computer readable storage device storing instructions executable by one or more processors to perform acts comprising:
  selecting, from a cache, a set of candidate rows to be written to multiple hard drives;
  for particular candidate rows in the set of candidate rows, identifying a corresponding subset of the multiple hard drives as destination locations of the particular candidate rows;
  placing a first plurality of candidate rows in a first slab corresponding to a first plurality of hard drives;
  placing a second plurality of candidate rows in a second slab corresponding to a second plurality of hard drives, the second plurality of candidate rows being placed in the second slab based at least partly on a first determination that each hard drive of the first plurality of hard drives is different than each hard drive of the second plurality of hard drives;
  placing a third plurality of candidate rows in a third slab corresponding to a third plurality of hard drives, the third plurality of candidate rows being placed in the third slab based at least partly on a second determination that:
    at least a first hard drive of the third plurality of hard drives is common to the first plurality of hard drives,
    at least a second hard drive of the third plurality of hard drives is different than each hard drive of the first plurality of hard drives, and
    each hard drive of the third plurality of hard drives is different than each hard drive of the second plurality of hard drives; and
  destaging in parallel to the second slab one of the first slab or the third slab, wherein each of the first slab, the second slab, and the third slab include one or more sets of sequential locations that are distributed across the multiple hard drives.

7. The computer readable storage device of claim 6, wherein selecting, from the cache, the set of candidate rows to be written to the multiple hard drives, comprises:
  determining whether a usage of the cache exceeds a predetermined threshold; and
  in response to determining that the usage of the cache exceeds the predetermined threshold, selecting, from the cache, the set of candidate rows to be written to the multiple hard drives.

8. The computer readable storage device of claim 6, wherein:
  each candidate row comprises multiple data items aggregated from multiple writes destined for one or more of the multiple hard drives;
  a first data item of the multiple data items is to be written to a first location within the multiple hard drives; and
  a remainder of the multiple data items are to be written within a predetermined distance from the first location.

9. The computer readable storage device of claim 6, wherein selecting, from the cache, the set of candidate rows to be written to the multiple hard drives, comprises:
  identifying destination hard drives to which each candidate row of the set of candidate rows is destined to be written;
  selecting candidates rows from the cache for inclusion in the set of candidate rows based on a number of the destination hard drives to be written to when writing the set of candidate rows.

10. The computer readable storage device of claim 6, the acts further comprising:
  selecting candidates rows placed in a plurality of queues, each of the plurality of queues associated with a corresponding hard drive of the first plurality of hard drives; and
  writing the selected candidate rows in parallel to at least a portion of the multiple hard drives.

11. The computer readable storage device of claim 6, the acts further comprising:
  in response to placing the first plurality of candidate rows in one or more queues corresponding to the first plurality of hard drives, incrementing a queue depth counter associated with each of the one or more queues.

12. The computer readable storage device of claim 6, wherein placing the first plurality of candidate rows in the first slab, comprises:
  placing the first plurality of candidate rows in the first slab in response to determining that each of the first plurality of candidate rows is destined to be written to each of the first plurality of hard drives.

13. A method comprising,
under control of one or more processors:
  selecting, from a cache, a set of candidate rows to be written to multiple hard drives, individual candidate rows in the set of candidate rows selected based on how many destination hard drives the individual candidate rows are to be written to;
  placing a first plurality of candidate rows in a first slab corresponding to a first plurality of hard drives;
  placing a second plurality of candidate rows in a second slab corresponding to a second plurality of hard drives, each hard drive of the first plurality of hard drives being different than each hard drive of the second plurality of hard drives;
  placing a third plurality of candidate rows in a third slab corresponding to a third plurality of hard drives, the placing the third plurality of candidate rows in the third slab being based on a determination that: (i) at least a first hard drive of the third plurality of hard drives is common to the first plurality of hard drives, (ii) and at least a second hard drive of the third plurality of hard drives is different than each hard drive of the first plurality of hard drives, (iii) and each hard drive of the third plurality of hard drives is different than each hard drive of the second plurality of hard drives;
  destaging in parallel to the second slab one of the first slab or the third slab, wherein each of the first slab, the second slab, and the third slab include one or more sets of sequential locations that are distributed across multiple ones of the destination hard drives; and
  incrementing a queue depth counter corresponding to the destination hard drives.

14. The method of claim 13, wherein at least one of the multiple hard drives is used to store parity data that is generated based on a logical exclusive OR operation.

15. The method of claim 13, wherein:
  the multiple hard drives include a third hard drive and a fourth hard drive; and
  the third hard drive is a mirror of the fourth hard drive.

16. The method of claim 13, the acts further comprising:
  confirming that a particular candidate row has been written to a storage area of a particular destination hard drive; and
  decrementing the queue depth counter corresponding to the particular destination hard drive.

17. The method of claim 13, wherein selecting, from the cache, the set of candidate rows to be written to the multiple hard drives comprises:
  repeatedly selecting a candidate row for inclusion in the set of candidate rows based on destination drives associated with the candidate row until a predetermined number of candidate rows has been selected.

18. The method of claim 13, the acts further comprising:
  writing candidate rows to destination hard drives in parallel; and
  selecting a second set of candidate rows while writing the candidate rows to the destination hard drives.

19. The method of claim 13, wherein the set of candidate rows are selected from the cache in response to determining that a usage of the cache exceeds a predetermined cache threshold.

20. The method of claim 13, wherein placing the first plurality of candidate rows in the first slab is performed in parallel with selecting an additional set of candidate rows.

* * * * *